Patented Oct. 31, 1922.

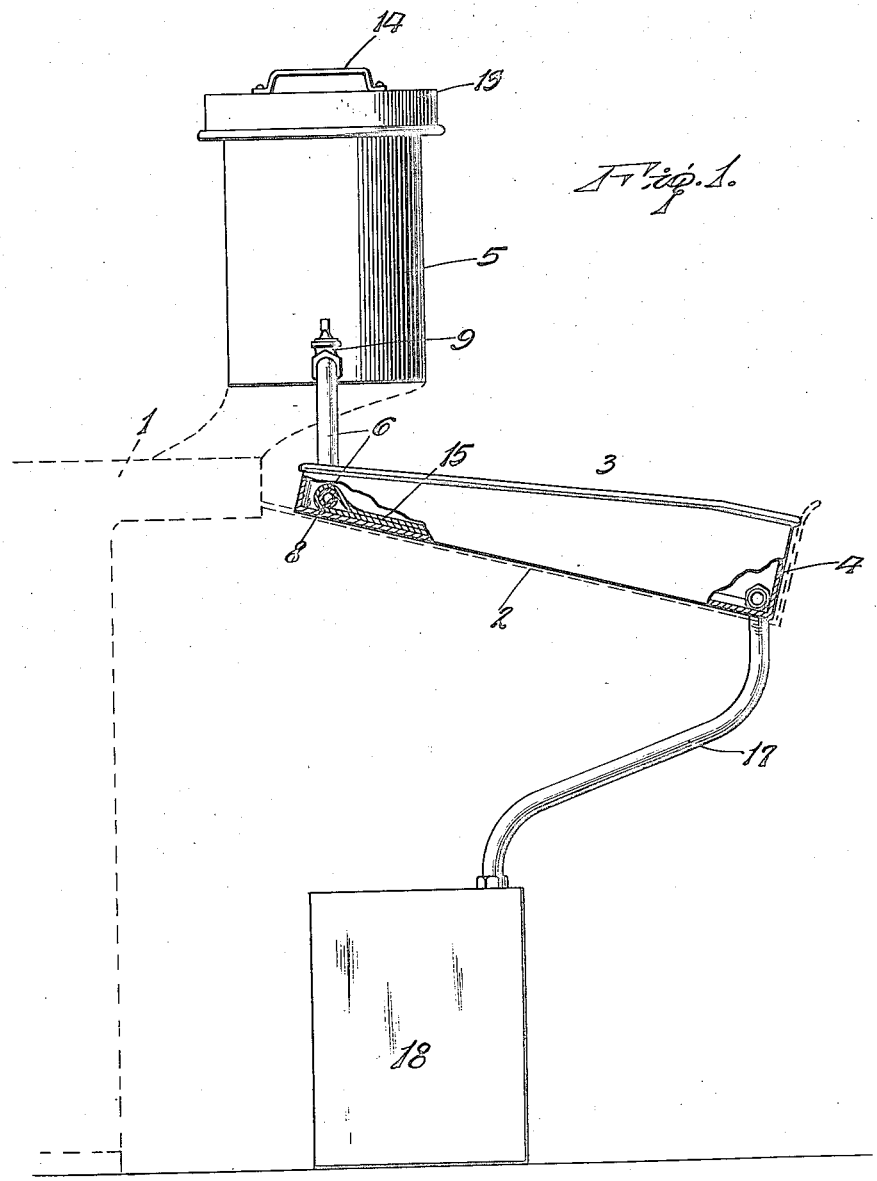

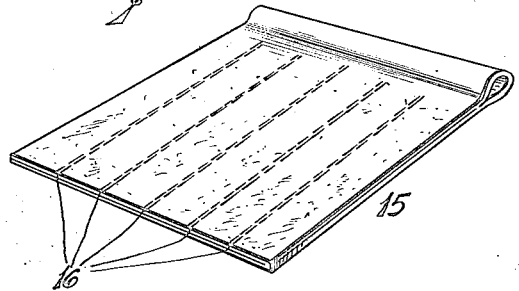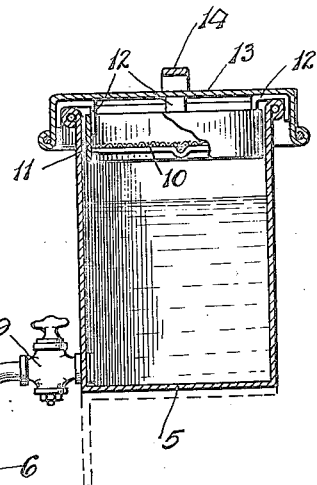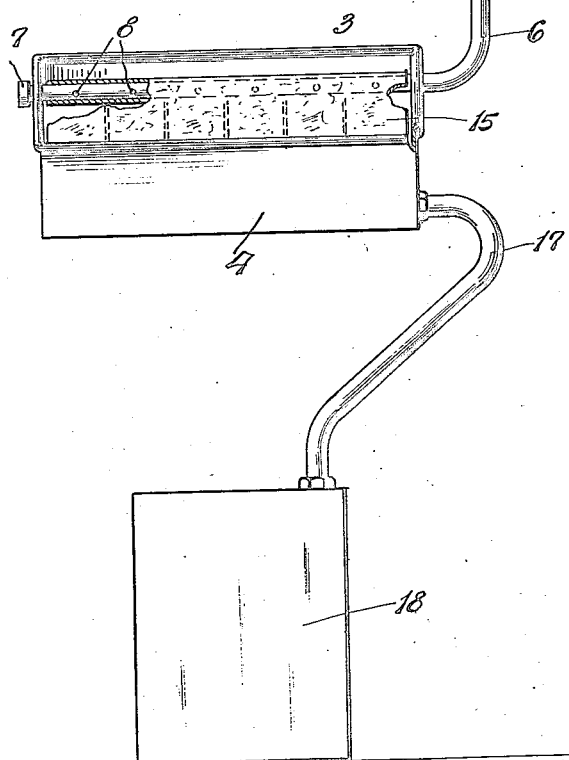

1,434,181

UNITED STATES PATENT OFFICE.

HARRY H. L. WRIGHT AND WILLARD B. PRICE, OF MONTOUR FALLS, NEW YORK.

DOUGH-GREASING APPARATUS.

Application filed April 21, 1921. Serial No. 463,319.

*To all whom it may concern:*

Be it known that we, HARRY H. L. WRIGHT and WILLARD B. PRICE, citizens of the United States, residing at Montour Falls, in the county of Schuyler and State of New York, have invented certain new and useful Improvements in Dough-Greasing Apparatus, of which the following is a specification.

This invention seeks to provide means whereby dough, as it is discharged from a dough-molding machine, may be automatically greased to be placed in the baking pans. Heretofore this work has been done by hand and has been wasteful in both time and effort and has been lacking in uniformity of results. The object of our invention, therefore, is to provide simple and inexpensive means whereby the dough, after being molded, will automatically receive a coating of grease which will be uniform in its application to all the loaves so that the loaves will be very rapidly prepared for placing in the baking pans. The invention also effects an economy in material and in the time required for the operation.

In the accompanying drawings—

Figure 1 is a side elevation, partly broken away and in section, of our improved apparatus in its operative position;

Fig. 2 is an end elevation, partly broken away and in section, of the apparatus;

Fig. 3 is a detail perspective view of the absorbent mat which is employed.

In the drawings, a portion of the delivery end of a dough-molding machine is indicated in dotted lines at 1 and the shelf upon which the loaves are ordinarily delivered from said machine is indicated in dotted lines at 2. In carrying out our invention, we employ a pan 3 which is preferably rectangular in outline and is of proper dimensions to be supported upon the shelf 2 and receive the dough from the molding machine. The shelf is inclined downwardly from the molding machine and, of course, the pan will assume the same inclination, and to prevent the loaves rolling from the pan the lower end wall 4 thereof has a greater height than the upper end wall, as clearly shown. We also employ a reservoir or tank 5 which may be of any convenient or preferred dimensions and form and from the lower end of said reservoir a pipe 6 extends to and into the upper end of the pan, the pipe extending transversely through the upper end of the pan and being closed at its remote end by a cap 7. In the side of the pipe, within the pan, are a series of perforations 8 through which the grease or oil may escape and adjacent the reservoir the pipe is provided with a cut-off valve 9 by which the flow of the grease may be controlled. The reservoir has an open upper end and within the said open upper end we suspend a strainer 10 which is preferably a fine mesh screen through which the oil or grease may readily flow but by which all solid matters or other impurities will be arrested. The screen comprises a rim or ring 11 and brackets 12 secured rigidly to the said rim and extending upwardly therefrom and then laterally to engage over the upper edge of the reservoir in a hook-like manner. The netting or screen proper is preferably reinforced by two wires disposed against its under side, as shown in Fig. 2. A cover 13 is also provided and this cover is constructed with a depending annular rim which is adapted to encircle the upper end of the reservoir and thereby prevent the entrance of dust and other foreign matters into the same. The cover should be sufficiently heavy to hold the brackets 12 in engagement with the reservoir and it is equipped with a handle 14 of any convenient form whereby it may be easily removed from and placed on the reservoir.

Upon the bottom of the pan, we place a mat 15 preferably consisting of several layers of cheese cloth or similar inexpensive absorbent material, the several layers being united by longitudinal lines of stitching, indicated at 16, and these lines of stitching are so located that each perforation 8 in the delivery pipe 6 will be disposed between two lines. The upper end portion of the mat is preferably left unstitched and is formed by folding or doubling the layers or plies thereof into tubular form to enclose the delivery pipe whereby the oil or grease escaping from said pipe will be delivered to the interior of the mat and will thoroughly saturate the same. It will be readily understood that a thin film of the oil will be thereby produced upon the surface of the mat and the loaves deposited thereon will take up a small coating of said film.

Obviously, there is a possibility that the oil may flow to the mat excessively or there may be intervals in the operation when loaves are not being deposited on the mat and to avoid waste of this surplus and excessive coating of the loaves we provide an outlet pipe 17 which has one end secured in the pan at the lower end thereof and leads from the pan to a receptacle 18 of any preferred form.

The reservoir 5 may be supported in any preferred manner, a very convenient support being furnished by a shelf or bracket secured on the side of the molding machine, as indicated in dotted lines in Figs. 1 and 2.

It is thought the use of the device will be readily understood. When the loaves are to be coated, the valve 9 is opened to the proper degree and the oil or grease thereby permitted to flow from the reservoir 5 to the pan and percolate through the mat so as to saturate the same. As the loaves are discharged from the molding machine, they will be delivered into the pan upon the mat and will tend to roll to the lower end of the pan, being thereby coated uniformly with the oil in an obvious manner. The surplus grease or oil will flow through the pipe 17 and accumulate in the receptacle 18 and, when this receptacle has been filled, the pipe 17 may be momentarily detached therefrom and this end held in such a position that the flow will be arrested while the contents of the receptacle are returned to the reservoir 5 by being poured through the strainer 10 and it will, of course, be understood that the initial supply of grease or oil is placed in the reservoir in the same manner by pouring it through the strainer 10.

Our device is obviously simple in the construction and arrangement of its parts and may be installed at a very low cost. It may be employed in connection with any known form of dough-molding machine and will minimize, if not entirely eliminate, the manual labor heretofore necessary in coating the dough or the pans preparatory to baking. By the use of our apparatus, the loaves will be uniformly coated with just enough oil or grease to insure proper baking and a better and more uniform crust and color will be produced in the finished loaf. When renewal of the mat is necessary, the cap 7 is removed from the pipe 6 and the pan and mat may then be slipped over the end of the pipe.

Having thus described the invention, what is claimed as new is:

1. An apparatus for the purpose set forth comprising a mat consisting of a plurality of plies of textile material supported in an inclined position to receive formed loaves, and means for delivering grease between the plies at the upper end of the mat.

2. An apparatus for the purpose set forth comprising an absorbent mat consisting of several plies of textile material united by longitudinal rows of stitching, means for supporting said mat in an inclined position to receive molded loaves, and means for supplying grease between the plies of the mat at the upper end thereof and between the lines of stitching.

3. An apparatus for the purpose set forth comprising an absorbent mat supported in an inclined position to receive molded loaves, a reservoir supported above the mat, a tubular conveyor leading from the reservoir and having its delivery end disposed transversely within the upper end of the mat and provided with perforations to discharge into the mat.

4. An apparatus for the purpose set forth comprising an absorbent mat, a reservoir disposed above the mat, a conduit leading from the lower end of the reservoir into the upper end of the mat, a screen supported in the upper end of the reservoir, brackets rising from the screen and engaging over the edge of the reservoir, and a covering over the reservoir bearing upon said brackets.

In testimony whereof we affix our signatures.

HARRY H. L. WRIGHT. [L. S.]
WILLARD B. PRICE. [L. S.]